United States Patent [19]

Reed

[11] 4,326,685

[45] Apr. 27, 1982

[54] SUN-SENSING GUIDANCE SYSTEM FOR HIGH-ALTITUDE AIRCRAFT

[75] Inventor: Robert D. Reed, Lancaster, Calif.

[73] Assignee: The United States of America as represented by the Administrator of the National Aeronautics and Space Administration, Washington, D.C.

[21] Appl. No.: 129,783

[22] Filed: Mar. 12, 1980

[51] Int. Cl.³ .................... G05D 1/00; B64C 13/20
[52] U.S. Cl. ......................... 244/175; 244/168; 244/190; 318/580
[58] Field of Search ............... 114/144 E; 244/171, 244/168, 3.18, 176, 175, 190; 73/178 R; 250/203 R; 318/580, 640; 126/425

[56] References Cited

U.S. PATENT DOCUMENTS 2,921,757  1/1960  Honle .................... 250/203 R
3,780,966  12/1973 Newcomb, Jr. et al. ........ 244/171

Primary Examiner—Sherman D. Basinger
Attorney, Agent, or Firm—Paul F. McCaul; John R. Manning

[57] ABSTRACT

A sun-sensing guidance system (10) for high-altitude aircraft (A) characterized by a disk-shaped body (14) mounted for rotation aboard the aircraft in exposed relation to solar radiation and having a plurality of mutually isolated chambers (28a, 28b, 32a, and 32b); each chamber of the plurality being characterized by an opening having a photosensor (34a, 34b, 36a, and 36b) disposed therein and arranged in facing relation with the opening for receiving incident solar radiation and responsively providing a voltage output, said photosensors being connected in paired relation through a bridge circuit (38) for providing heading error signals in response to detected imbalances in intensities of solar radiation incident on the photosensors of either pair of photosensors until a nulled relationship is achieved for the disk (14) to the source of radiation.

4 Claims, 7 Drawing Figures

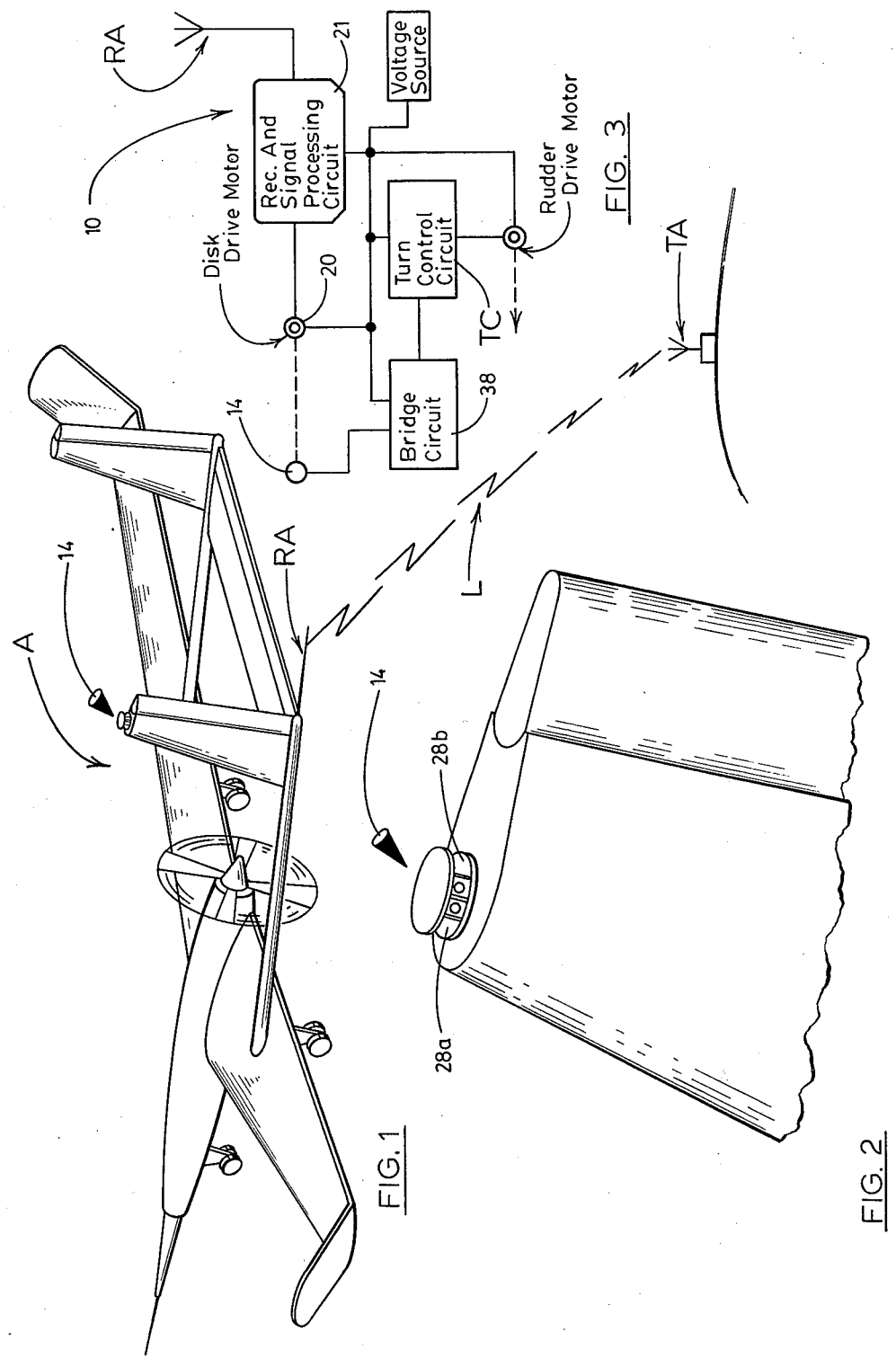

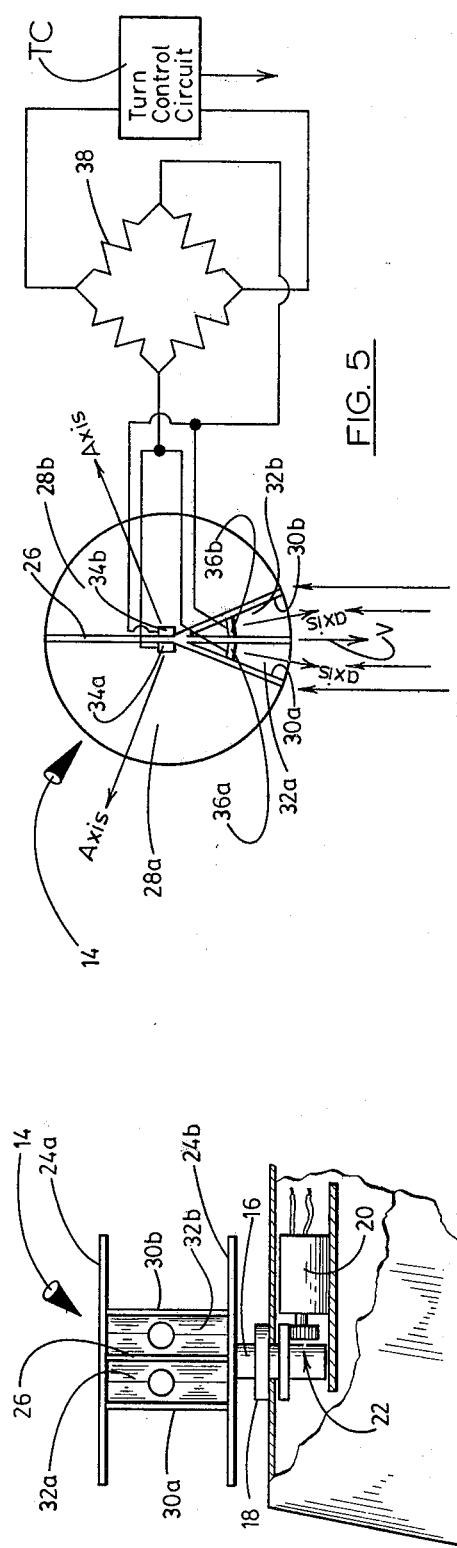
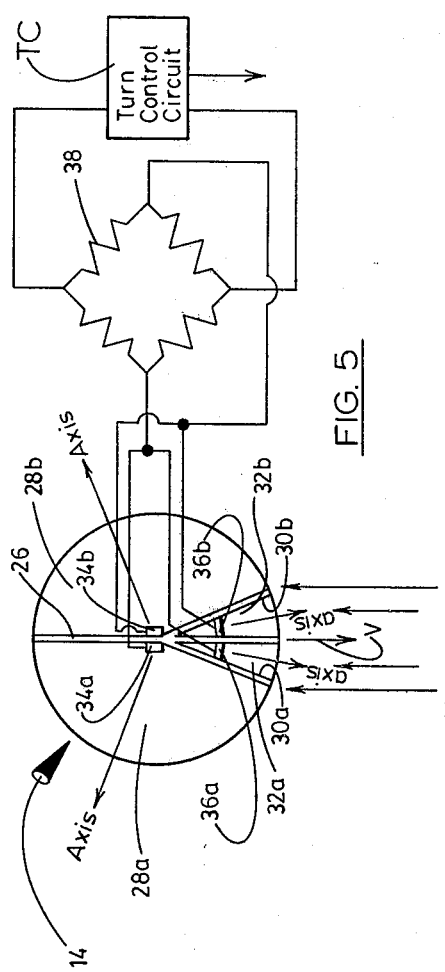
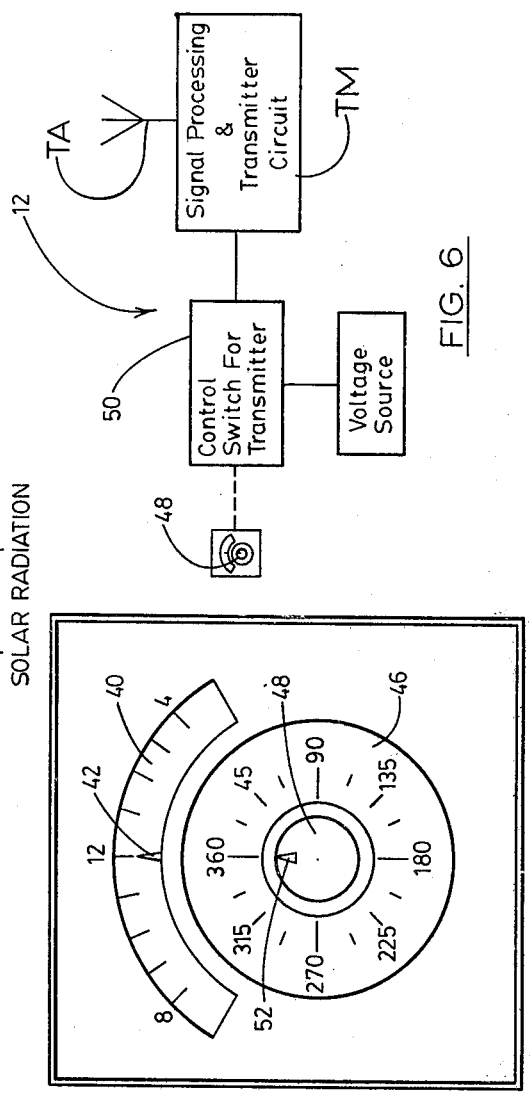
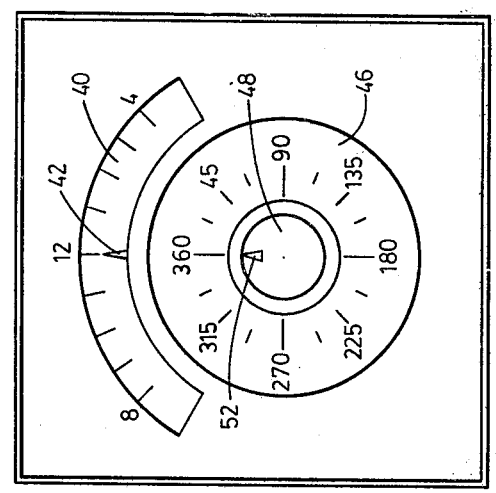

SUN-SENSING GUIDANCE SYSTEM FOR HIGH-ALTITUDE AIRCRAFT

ORIGIN OF THE INVENTION

The invention described herein was made in the performance of work by an employee of the United States Government and may be manufactured and used by or for the Government for Governmental purposes without the payment of any royalties thereon or therefor.

BACKGROUND OF THE INVENTION

1. Field of the Invention

The invention generally relates to light-sensing guidance systems for aircraft, and more particularly to a sun-sensing guidance system particularly suited for use aboard high-altitude unmanned aircraft and employed for constantly providing heading signals for maintaining the aircraft's track on a selected course line.

2. Description of the Prior Art

The prior art is, of course, replete with light-sensitive guidance systems for unmanned aircraft and the like. For example, U.S. Pat. No. 2,155,402 discloses a sun compass having a pair of normally balanced photo-electric, heat, or other radiation sensing circuits. The sensitive elements of the radiation sensing circuits are so arranged that when the device bears a predetermined angular relation to a source of celestial radiant energy, such as the sun, the circuit achieves a balanced condition and an angular relation in terms of two geographical directions becomes known.

U.S. Pat. No. 2,921,757 discloses a long-range navigation device installed in aircraft, or guided missles, which serves to orient an aircraft in accordance with a selected course relative to a celestial body. A simulated track is plotted as a function of time and a calibrated direction of the celestial body; the device is linked with a track so that a compass will continuously realign the track relative to the aircraft in accordance with the instantaneous position of the celestial body.

U.S. Pat. No. 2,182,717 discloses a motor-controlled system for a rudder which utilizes light sensitive devices for controlling the motor comprising a reflector mounted on a compass card, the position of which is changed in response to changes in the direction of deviation from a selected course, with a resultant light signal being picked-up for providing an error signal employed in reorienting the craft's rudder.

U.S. Pat. No. 3,423,047 discloses an apparatus which employs a light sensitive device for stabilizing the position of flight for a flying body utilizing restoration means dependent upon whether the deviation occurs in a small range, or in a large range outside the small range. A first restoring action is initiated responsive to deviation in the small range, and if the deviation progresses into a large range, a second restoration is initiated. A control circuit having photo sensing devices responsive to changes in position of light-beams impinging thereon serves to provide the necessary output signals.

In other words, it is recognized that numerous attempts have been made to utilize light detection devices for providing directional intelligence in navigational systems. Unfortunately, use of prior art devices and systems heretofore made available in the industry, tends to be impaired by one or more inherent inadequacies. For example, an on-board guidance system must be dependable, preferably of light-weight construction characterized by simple circuitry, and be economically feasible to fabricate and maintain. The desirability of these characteristics is particularly significant in instances where the craft within which the system is to be employed is one particularly designed for high-altitude, unmanned surveillance missions and having contemplated single mission longevity.

It is, therefore, the general purpose of the instant invention to provide a simple, economic, light-weight and dependable sun-sensing guidance system for high-altitude, unmanned aircraft.

OBJECTS AND SUMMARY OF THE INVENTION

It is the object of the instant invention to provide an improved sun-sensing guidance system.

It is another object to provide in a sun-sensing guidance system an improved sensing device.

It is another object to provide in a sun-sensing guidance system for high-altitude, unmanned aircraft, an improved sun-sensing device having a capability for locking on to the sun and providing heading error signals for use in establishing and maintaining a track along a selected course line.

It is another object to provide a simplified and economic sun-sensing guidance system characterized by a capability of accommodating manual up-date for changes in the diurnal positions of the sun.

These and other objects and advantages are achieved through the use of a disk-shaped body adapted to be mounted aboard an aircraft in exposed relation to solar radiation and repositioned to a selected orientation relative to the longitudinal axis of the aircraft for achieving a null position relative to the sun only when the aircraft is on-course, and circuit means for periodically up-dating the orientation of the body relative to the aircraft for purposes of compensating for changes in the diurnal position of the sun relative to the aircraft, as will hereinafter become more readily apparent by reference to the following description in claims in light of the accompanying drawings.

DESCRIPTION OF THE DRAWINGS

FIG. 1 is a perspective schematic view of an unmanned aircraft equipped with an improved sun-sensing guidance system embodying the principles of the instant invention.

FIG. 2 is a fragmented view of the aircraft's vertical stabilizer having mounted thereon a disk-shaped sun-sensing body included in the system which embodies the principles of the instant invention.

FIG. 3 is a diagrammatic view, in simplistic block form, of an electrical circuit typifying the circuitry included within the guidance system.

FIG. 4 is a fragmented, side-elevational view on an enlarged scale, of the vertical stabilizer and body shown in FIGS. 1 and 2.

FIG. 5 is a diagrammatic view, also in simplistic block form, depicting the body with its cover plate removed and circuitry typifying circuitry employed in coupling the sun-sensing body with the aircraft's on-board circuitry.

FIG. 6 is a diagrammatic view, also in block diagram form, of ground based circuitry included within the system.

FIG. 7 is a side-elevational view of the face of an instrument dial employed in achieving control over the position of the body relative to the aircraft.

DESCRIPTION OF THE PREFERRED EMBODIMENT

Referring now to the drawings, wherein like reference characters designate like or corresponding parts throughout the several views, there is shown in FIG. 1, a high-altitude, unmanned aircraft, generally designated A, the heading of which is controlled through a use of a sun-sensing guidance system embodying the principles of the instant invention.

As indicated in FIG. 3, the sun-sensing guidance system includes an on-board circuit, generally designated 10 and, as depicted in FIG. 6, a ground-based circuit, generally designated 12.

It is, at this juncture, important to appreciate that each of the circuits 10 and 12 is of a suitable design, well within the purview of the art, which, in practice, is in practice varied as desired. Moreover, in view of the stated purpose of the instant invention it should be appreciated that each of the circuits 10 and 12 is of a complexity of low-order, while yet being adapted electronically to be coupled through an up-link L, or transmissions from the circuit 12. As illustrated, the up-link serves to connect an on-board signal receiving antenna RA, for the circuit 10, with the transmitting antenna TA for the circuit 12.

Mounted on the aircraft A is a rotatable sun-sensing disk 14. Preferably, the sun-sensing disk 14 is mounted at the uppermost end of a vertical stabilizer, as shown in FIG. 1, in order to facilitate its being substantially continuously positioned in unmasked relation to the rays of the sun when the aircraft is in flight.

Turning now to FIG. 4, it can be seen that the sun-sensing disk 14 is supported by a vertical shaft 16, as illustrated, mounted through the use of a suitable bearing block 18 affixed to the stabilizer. A suitable reversable motor 20 is coupled to the shaft 16 through suitable gearing, generally designated 22. It is to be understood that the gearing 22 is of a suitable design, such as mated bevel gears, which serve to impart rotary motion to the shaft 16 in response to an electrical energization of the motor 20. Moreover, the motor 20 preferably comprises a reversable DC motor suitably supported by means not designated. However, the design of the motor is, of course, such that when energized, the shaft 16, and consequently the disk 14, is driven in rotation through the gearing 22 in a direction determined by the direction in which the motor is driven.

The sun-sensing disk 14, as shown, is formed of a suitable opaque material and includes a top plate 24a and a bottom plate 24b. The plates 24a and 24b are separated by a wall defining divider 26 which extends diametrically across the disk for supporting the plates 24a and 24b and for thus establishing a first pair of chambers, designated 28a and 28b, at opposite sides thereof.

Additionally, projected angularly from the divider 26, there is a pair of walls defining dividers 30a and 30b. These walls, or dividers, extend radially from the center of the disk to the periphery thereof for establishing a pair of similar chambers, designated 32a and 32b. In practice, the dividers 30a and 30b form an included angle with the divider 26 of approximately 20°. However, it will be appreciated that the angle for the angular relationship of the dividers is varied as desired, depending in part upon the level of sensitivity required, as will hereinafter become more readily apparent.

It should now be apparent that each of the chambers 28a through 32b is wedge-shaped and is characterized by peripherally directed openings. The axes, indicated by arrows, for the chambers 28a and 28b project from opposite sides of the divider 26 in substantially opposite directions, while the axes for the openings of the chambers 32a and 32b project in a substantially common direction, substantially perpendicular to the axes of the chambers 28a and 28b.

It is important to note that when the openings of the chambers 32a and 32b are caused to face a source of solar radiation, common to both, so that a line projected in bisecting relation to the included angle defined by the axes of the opening 32a and 32b bisects the source of solar radiation, the disk 14 has assumed a position, herein referred to as a "null position". When the disk 14 is thus caused to assume a null position, an equal quantity of solar radiation is accepted by both of the chambers 32a and 32b. Thus the system is caused to "lock-on" to the sun, for reasons which will hereinafter become more readily apparent.

However, since the axes of the chambers 28a and 28b are projected in substantially opposite directions, it substantially is never possible for equal quantities of radiation to enter these chambers. As a practical matter, direct rays of solar radiation are accepted into one or the other of the chambers but, as intended, never both simultaneously. Moreover, it is noted that when the disk 14 is in a null position, the dividers 30a and 30b, in effect, mask or shade the chambers 28a and 28b from rays of solar radiation.

Mounted within the chambers 28a and 28b, in positions to be bisected by the axes thereof, there is a first pair of photosensors 34a and 34b of a suitable design. Preferably, the photosensors comprise photovoltaic devices which, in the presence of incident solar radiation, cause an electrical current to flow in a manner fully appreciated by those familiar with such devices.

Similarly, within the chambers 32a and 32b, also in positions to be bisected by the axes of the openings for these chambers, there is a second pair of photosensors, or photovoltaic devices, designated 36a and 36b. It is noted, FIG. 5, that the photosensors 34a and 34b of the first pair are connected to a common wheatstone bridge circuit 38, at opposite sides thereof, through suitable leads, not designated. Similarly, the pair of photosensors 36a and 36b of the second pair are connected at opposite sides of the bridge circuit 38. The voltage output obtained from the photosensors of each pair is compared by the bridge circuit 38. Consequently, when the disk 14 is in its null position, the bridge circuit 38 is in a "balanced" condition. Thus the positions for the disk 14 continuously is monitored as the photovoltage output from the photosensors 34a, 34b, 36a and 36b is monitored at the bridge circuit 38.

The output signal obtained from the bridge circuit 38 comprises a heading error signal for the aircraft and exists in the presence of an unbalanced condition for the bridge circuit 38. This signal is applied across a turn control circuit, of any suitable design, herein shown in block diagram form and designated TC.

As a practical matter, the turn control circuit TC is connected to be employed for varying the positions of various control surfaces such as rudders, ailerons, and the like, as is necessary to achieve changes in the heading for the aircraft A. At this juncture, it should be apparent that so long as the disk 14 is in its null position, relative to the source of solar radiation, the bridge circuit 38 is balanced and its output substantially is non-existent. However, should the aircraft A be caused to change its heading, because of wind conditions, shift in the center of mass and the like, the intensity, or quantity, of radiation incident upon the photosensors 36a and 36b will become unequal. Consequently, the bridge circuit 38 will become unbalanced for thereby causing a heading error signal to be applied across the turn control circuit TC, whereupon the turn control circuit TC will be activated to provide an output to be utilized by suitable mechanisms for purposes of driving control surfaces for thereby changing the heading of the aircraft in a direction such that the disk 14 again is thus caused to assume a null position.

As a practical matter, the ground based circuit 12 includes means for compensating for diurnal progression of the sun. As shown, the circuit includes a control box having on its face a scale, designated 40, of a generally arcuate configuration bearing indicia indicative of the diurnal position for the sun relative to the aircraft, for a given hour of the day. As shown, the scale represents a time span of 0400 to 2000 hours, with two hour gradations. A moveable pointer 42 is provided to be repositioned along the scale 40 for purposes of indicating the position of the sun at a given time of day, a basic reference point. The pointer 42 may be thought of as indicating the horizontal position of the sun, at a given time of day relative to an axis craft on a northerly heading, the null position for the disk 14 relative to the aircraft A. Concentrically related to the scale 40 is a rotatable compass card 46 adapted to be rotated in order that the indicia indicating north, or 360°, is alignable with the pointer 42, regardless of the position assumed by the pointer along the scale 40. The compass card 46 may be thought of as a magnetic compass card for the aircraft A.

As shown, the compass card is oriented for 1200 hours. A manually operable control knob 48 for controlling a transmitter switching circuit, designated 50, is provided with an includes on the face thereof, a marker 52. This marker may be thought of as the nose of the aircraft A. It will be appreciated that by positioning the marker 52 in alignment with a selected indicia on the compass card, here shown as due north, direction of flight for the aircraft readily is selected.

As a practical matter, the switching circuit 50 for the ground based circuit 12 can, where so desired, simply comprise an on-off switch which energizes a signal processing and transmitter circuit TM for a period having a duration such that the motor 20 is permitted to rotate the sun-sensing disk 14 through an angular distance for causing it to assume a position constituting a null position when the aircraft is on course. Due to the fact that the pointer 42 is moveable along the scale 40, each diurnal position, or position of the sun along its diurnal track for a given time of day, may be represented on the face of the control box, so that the compass card may be realigned to a new position for the sun, whereby the control switch for the transmitter circuit TM may be repositioned and thus the system updated for a given time of day.

Again, since the circuitry for the circuits 10 and 12 is well within the purview of the art, the details thereof form no part of the claimed invention, and the design thereof may be varied as desired, a detailed description of the circuits is omitted in the interest of brevity. It suffices to understand that for different hours of the day the sun assumes different positions along the diurnal path. Consequently, the position of the disk 14 must be varied relative to the aircraft to compensate for the position of the sun if the aircraft is to maintain a constant course. Since the sun's position changes continuously relative to the aircraft A, and such are known factors, the position of the disk 14 relative to the aircraft for a given time of day readily can be determined and the position of the disk altered to compensate for the change in the sun's position.

OPERATION

With the sun-sensing system assembled in the manner hereinbefore described and mounted aboard an aircraft, the aircraft is launched in flight, preferably to high altitudes. Assuming, for the moment, that the launch is to occur at 12 noon, the pointer 42 is moved along the scale in the position 12, for thus indicating the diurnal position of the sun relative to the aircraft A. The compass card 46 is rotated so that north, or the indicia indicating 360° is aligned with the pointer 42. Assuming that the selected course line is north, or a compass heading of 360° is required in order for the aircraft to track along a selected course line, the control knob 48 is rotated for positioning the marker 52 opposite the course designation 360°. Thus the control switch 50 is activated for causing the signal processing and transmitter circuit TM to transmit a radio signal via the antenna TA to the antenna RA, located aboard the aircraft. The motor 20 responsively is energized for rotating the sensing disk 14 to a position relative to the aircraft such that the disk in a null position, once the aircraft is on course, for that given time of day.

In order to assure that the aircraft is on course, the sun-sensing disk 14 first functions in a gross heading error correction mode in which one or the other of the photosensors 34a or 34b is caused to "look" at the sun. Thus a voltage is derived from the photosensor facing the sun with the imbalance of the intensity in radiation being detected at the bridge circuit 38. This imbalance causes a signal to be applied across the turn control circuit TC which, in turn, provides a signal to be applied across the turn control circuit for activating the device, such as a rudder control motor, for the aircraft causing the aircraft to come about a new heading. This correction continues until such time as the disk 14 assumes a null position, with respect to the sun so that the photosensors 34a and 34b are masked from solar radiation while the photosensors 36a and 36b are subjected to a common level of intensity. In this condition, the circuit 38 assumes a balanced condition and the signal is removed from the turn control circuit TC.

Of course, should the heading of the aircraft A vary and an imbalanced condition be established for the bridge 38, an error correction signal will be applied across a turn control circuit TC for again establishing a new heading for the aircraft A until such time as the disk 14 again assumes a null position.

As the sun advances along its diurnal track, the pointer 42 is repositioned along the scale 40 and the compass card 42 is rotated into alignment therewith and thereafter, the knob 48 rotated to alignment with a preselected course.

It should now be apparent that the instant invention provides a simple and economic sun-sensing guidance system which is particularly suited for use aboard high-altitude, unmanned aircraft in maintaining selected course lines which may be varied during flight.

What is claimed is:

1. In a sun-sensing guidance system for high-altitude, unmanned aircraft, the improvement comprising:
   A. a disk-shaped body adapted to be mounted aboard an aircraft in exposed relation to solar radiation and having defined therein a plurality of mutually isolated chambers, each chamber of said plurality being characterized by an opening and having a photosensor disposed therein and arranged in facing relation with respect to the opening for receiving indicent solar radiation, each photosensor being adapted to provide a photovoltage output in response to incident solar radiation;
   B. circuit means interconnecting the plurality of photosensors in paired relationship including a wheatstone bridge circuit connected between the photosensors of each pair for providing a voltage output indicative of heading error in response to detected imbalance in the photovoltage output derived from a pair of photosensors;
   C. mounting means supporting said disk for rotation to a null position wherein the photovoltage output for the photosensors is balanced at said bridge circuit when the aircraft is on course; and
   D. means for rotating said disk for selecting a course including drive means for imparting rotation to the disk, a ground-based radio signal transmitter circuit and a radio signal receiver circuit mounted on said aircraft and electrically connected with said drive means.

2. In combination with an aircraft, a sun-sensing guidance system the improvement comprising:
   A. rotatable, disk-shaped body mounted aboard the aircraft in a position to be exposed to direct rays of the sun, said body being characterized by at least two pairs of chambers, each having a photosensor disposed therein and characterized by an opening having a peripherally directed axis for admitting said rays to strike the sensors when the opening faces the sun, the axes of the openings of one pair of chambers being projected in substantially opposite directions and the axes of the openings of the other pair of chambers being projected in substantially the same direction and at substantially ninety degrees with respect to the axes of said one pair of openings whereby the sensors of said one pair of chambers are precluded from simultaneously assuming a position facing the sun and the sensors of the other pair of chambers may be caused simultaneously to assume a position facing the sun;
   B. means for masking the photosensors of said one pair of chambers relative to the sun when the sensors of said other pair of chambers are in a position facing the sun; and
   C. means for rotationally displacing said body for simultaneously repositioning the sensors of said one pair of chambers to a masked position and the sensors of the pair to a position simultaneously to the sun.

3. The improvement of claim 2 wherein the rays of the sun are incident on only one photosensor when either opening of said one pair is caused to face the sun, and said means for displacing said body includes a motor connected in driving relation to said body, means for controlling said motor including a ground-based radio signal transmitter and an aircraft based radio signal receiver tuned to said transmitter and connected to said motor for controlling the operation thereof.

4. The improvement of claim 3 wherein said transmitter includes manually operable course selection control means characterized by an arcuate scale bearing indicia indicative of the diurnal positions of the sun relative to the aircraft, a pointer mounted on the scale and adapted to be moved therealong for marking an instantaneous diurnal position of the sun relative to the aircraft, a disk-shaped rotatable compass card concentrically related to said scale bearing indicia said indicia being indicative of compass heading and repositionable to an aligned relation with said pointer, and a rotatable transmitter circuit control knob having a position marker defined on the face thereof concentrically related to said compass card and adapted to be rotated for repositioning said indicia relative to said compass card for initiating transmission of a signal from said transmitter circuit to be received by said radio signal receiver for thereby causing said body to be displaced for repositioning said chamber relative to the sun.

* * * * *